March 22, 1932.   W. E. B. JORDAN   1,850,325
COTTON DISTRIBUTOR
Filed April 17, 1931   2 Sheets-Sheet 1
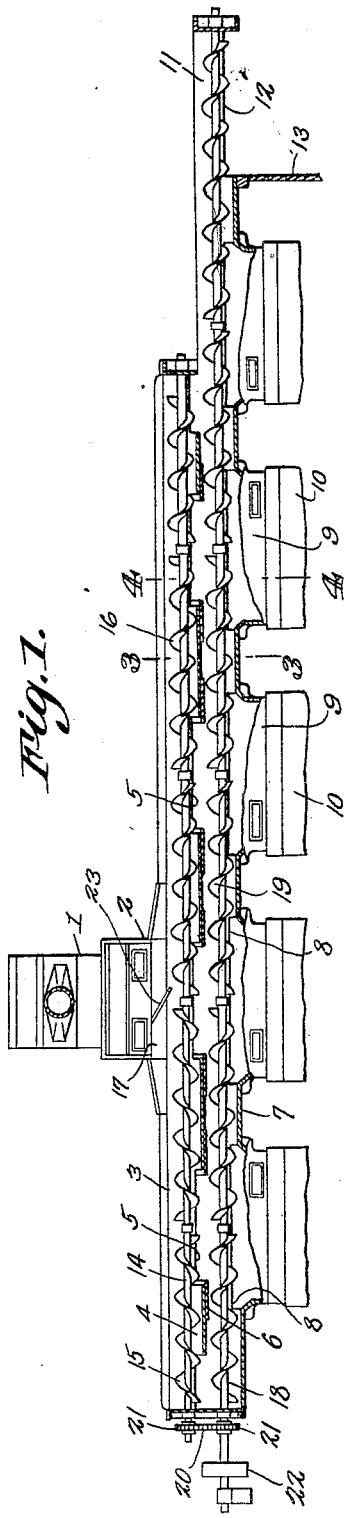
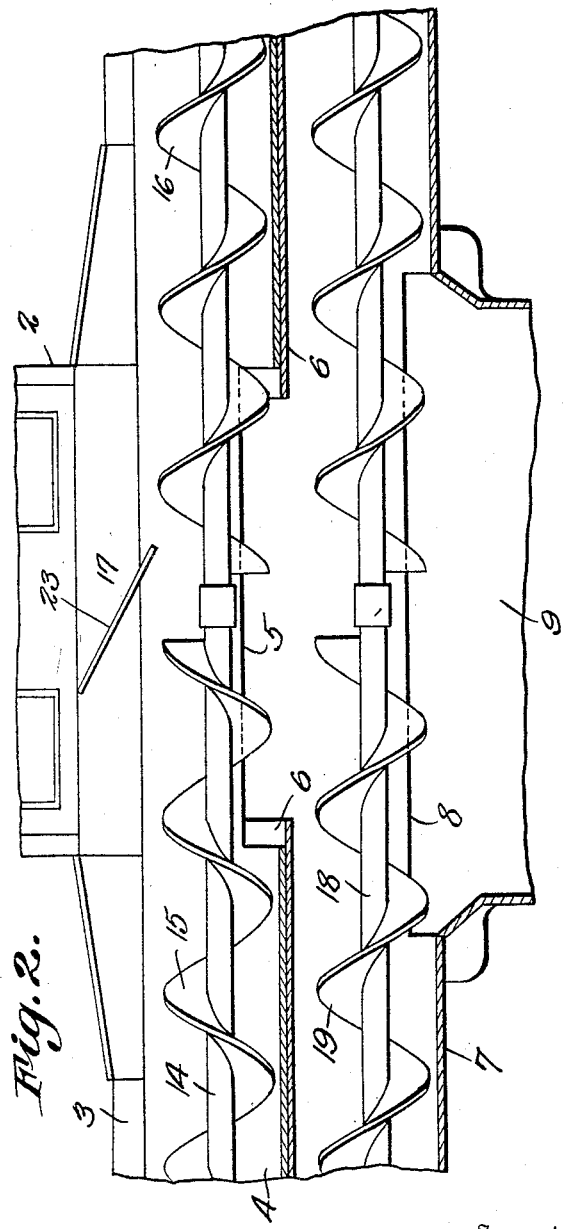
Inventor
W. E. B. Jordan
By C. A. Snow & Co.
Attorneys.

March 22, 1932.  W. E. B. JORDAN  1,850,325
COTTON DISTRIBUTOR
Filed April 17, 1931   2 Sheets-Sheet 2
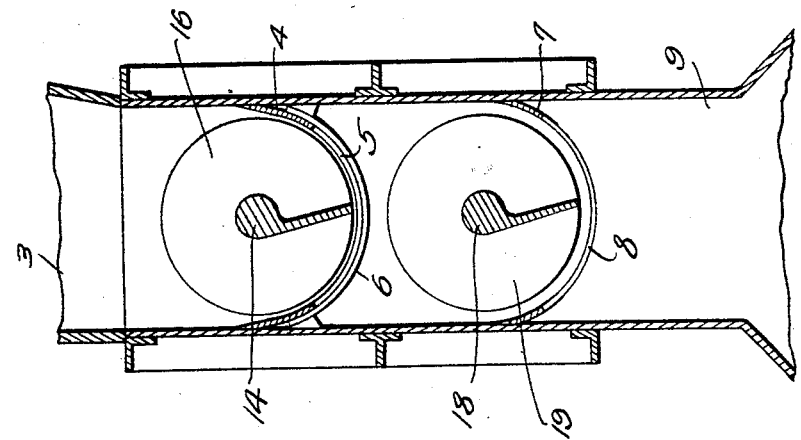
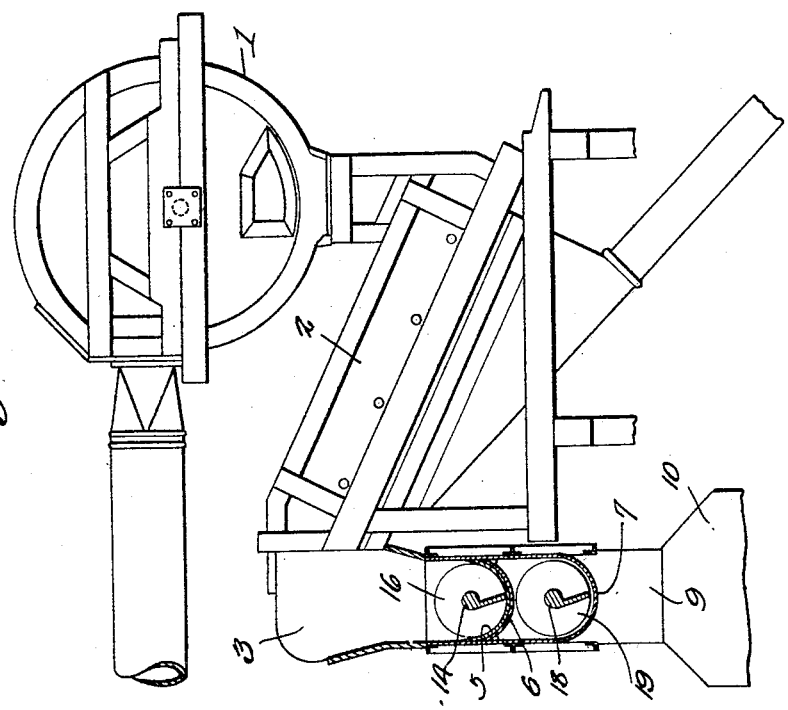
Inventor
W. E. B. Jordan
By C. A. Snow & Co.
Attorneys.

Patented Mar. 22, 1932

1,850,325

UNITED STATES PATENT OFFICE

WALTER E. B. JORDAN, OF DALLAS, TEXAS, ASSIGNOR OF ONE-HALF TO B. H. GRAHAM, OF SAN ANTONIO, TEXAS

COTTON DISTRIBUTOR

Application filed April 17, 1931. Serial No. 530,946.

This invention relates to a machine designed for distributing cotton to a number of gin feeders, one of the objects being to provide a cotton distributor utilizing rotary means for conveying the cotton to the points of discharge, it being possible to utilize the mechanism in connection with any standard type of cotton cleaner or dropper.

A still further object is to provide a cotton distributor in which cotton is conveyed in two directions from the inlet so as to be delivered at predetermined points to a conveyor which serves to conduct the cotton simultaneously to a number of outlets opening into the several gin feeders of a battery.

It has been found in practice that screw conveyors are the most advantageous means for distributing cotton, but heretofore, where these conveyors have been used the cotton cleaner or dropper has always been located at one end of the distributor. A single screw conveyor has then been utilized for conducting the cotton longitudinally of the distributor and delivering it to the several feeders of a series. These distributors have not always been satisfactory, however, because of the difficulty encountered in supplying cotton promptly to all of the feeders and in uniform quantities. As a result there has been a considerable waste of time and energy.

An object of the present invention is to provide a structure which permits the placing of the cotton cleaner or dropper at any desired point between the ends of the distributor, there being a means for conducting the cotton in opposite directions respectively from the inlet and in quantities sufficient to supply the feeders at the respective sides of the inlet.

It is also an object to combine with these conveying means one or more rotary conveyors of the screw or spiral type by means of which the cotton directed thereto will be promptly delivered to the adjacent feeders.

A still further object is to provide superposed conveyors performing the functions heretofore mentioned and between which are interposed valves for controlling the flow of cotton from one conveyor to the other.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings the preferred form of the invention has been shown.

In said drawings:

Figure 1 is a longitudinal section through the distributor taken from top to bottom and showing the present invention.

Figure 2 is an enlarged longitudinal section through the inlet portion of the distributor.

Figure 3 is an enlarged section on line 3—3, Figure 1.

Figure 4 is an enlarged section on line 4—4, Figure 1.

Referring to the figures by characters of reference, 1 designates a cotton separator of any standard construction for supplying cotton to a cleaner 2 which, in turn, delivers the cleaned cotton into the upper portion of the housing 3 of the distributor. This housing is of any desired length depending upon the number of gin feeders to be supplied with cotton. The cleaner can deliver cotton into the housing at a point between the ends thereof, as shown in Figure 1, and arranged longitudinally of the housing within the upper portion thereof is a trough 4 cut away at suitable intervals to provide outlets 5. Slidably engaging the trough adjacent to the outlets are valves 6 which can be adjusted toward or from each other by any suitable means so as to regulate the size of the openings through which cotton can be delivered downwardly from the trough.

Obviously the valves 6 could be arranged and operated in any other manner desired and could be used with or without the trough 4. These changes could be made without departing from the present invention.

The bottom of the housing 3 is also in the form of a trough 7 extending longitudinally, and this bottom trough is cut away to provide outlets 8 opening into hoppers 9 at the upper ends of gin feeders 10. Any desired number of gins can be contained in a series, each gin being provided with a feeder hopper for receiving cotton from one of the outlets 8.

The lower trough 7 is extended at one end beyond the upper trough 4 so as to provide an over-flow extension trough 11 having an outlet 12 in the bottom thereof located beyond an over-flow shield 13.

Extending longitudinally of the housing 3, above trough 4, is a shaft 14 and secured on this shaft are screw conveyors 15 and 16 which work close to the bottom of the trough 4. The worm conveyor 15 is designed to carry cotton toward one end of the housing 3 from the inlet 17 while conveyor 16 acts to carry cotton from the inlet toward the other end of the housing. In other words, the shaft 14 is provided with left hand and right hand screw conveyors and these terminate at their inner ends adjacent to the center of the inlet 17.

Extending longitudinally of the trough 7 and its extension 12 is another shaft 18 and a screw conveyor 19 rotates with this shaft. This screw conveyor is adapted to move cotton in one direction only.

All of the conveyors can be made up of two or more sections as shown and the two shafts 14 and 18 can be operatively connected by any suitable mechanism such as a chain 20 and sprockets 21. Thus when one of the shafts is actuated by any suitable mechanism, such as a belt engaging a pulley 22 on shaft 18, the two shafts will be rotated simultaneously.

In practice the cotton is treated in the usual manner in the separator and cleaner and then delivered to the inlet 17 of housing 3. This cotton will be moved to the right and to the left within the housing by the respective upper conveyors 16 and 15 so as to be delivered to the outlets 5 at opposite sides of the inlet. As the cotton gravitates through these outlets it will be engaged by the lower or supplemental conveyor 19 and moved longitudinally of the trough 7. Thus cotton will be delivered simultaneously and uniformly to the hoppers 9 of all of the feeders 10 and all surplus cotton will be conveyed to the outlet 12 where it will be delivered outside of the over-flow shield 13.

By manipulating the valves 6 the amount of cotton delivered at the respective outlets 5 can be controlled readily.

Obviously by arranging the inlet 17 at a point between the ends of housing 3, the cotton will be more quickly distributed to all of the feeders than would be possible should the cleaner be located at one end of the housing. Furthermore by employing upper screw conveyors for carrying the cotton in opposite directions respectively, a quick distribution is possible to different parts of the supplemental or lower conveyor. Should the inlet 17 be located nearer one end of the housing 3 than the other, a deflecting board such as indicated, for example, at 23 can be arranged for directing any necessary proportion of cotton in one direction while the remainder is free to be delivered in the opposite direction. For example, if there are three feeders at one side of the inlet to be supplied with cotton delivered in the opposite direction from the inlet, the board 23 can be arranged to deflect three-fifths of the cotton at the inlet in the direction of the three feeders while two-fifths will be left for distribution to the other two feeders.

The distributor herein described is advantageous not only because of the quick and accurate distribution of cotton effected thereby, but also because the conveying elements are all mounted for rotation about parallel axes and can be driven with less power than usual and with less danger of producing objectionable friction.

While the two conveyors have been shown with their axes in the same vertical plane, such an arrangement is not essential because while one should be above the other it could be arranged forwardly or rearwardly relative thereto.

What is claimed is:

1. A cotton distributor including a housing having an inlet between the ends thereof, upper and lower longitudinal troughs in the housing having spaced outlets, means for controlling the flow of cotton through the outlets in the upper trough, screw conveyors within the upper trough for conveying cotton from the inlet in opposite directions respectively to the outlets in the upper trough, and a screw conveyor in the lower trough for engagement with cotton delivered through said outlets to move it to the respective outlets in the lower trough.

2. A cotton distributor including a housing having an inlet and separate outlets, said outlets being provided for directing cotton to a series of feeders, a lower screw conveyor for conveying cotton in one direction within the housing to the respective outlets, and oppositely pitched screw conveyors thereabove for delivering cotton from the inlet to different portions respectively of the lower conveyor.

3. A cotton distributor including a housing having separate outlets for directing cotton into the respective gin feeders of a series, and having an inlet, upper oppositely pitched screw conveyors for conducting cotton in opposite directions respectively from the inlet, a trough for supporting cotton engaged by the upper conveyors, said trough having spaced outlets, and a lower screw conveyor for receiving cotton from said outlets and conveying it to the respective outlets of the housing.

4. A cotton distributor including a housing having separate outlets for directing cotton into the respective gin feeders of a series, and having an inlet, upper oppositely pitched screw conveyors for conducting cotton in opposite directions respectively from the inlet, a trough for supporting cotton engaged by the upper conveyors, said trough having spaced outlets, a lower screw conveyor for receiving cotton from said outlets and conveying it to the respective outlets of the housing, and valves for controlling the flow of cotton through the trough outlets.

5. A cotton distributor including a housing having an inlet between the ends thereof, upper and lower longitudinal troughs in the housing having spaced outlets, screw conveyors within the upper trough for conveying cotton from the inlet in opposite direction respectively to the outlets in the upper trough, and a screw conveyor in the lower trough for engagement with cotton delivered through said outlets to move it to the respective outlets in the lower trough.

In testimony that I claim the foregoing as my own, I have hereto affixed my signature.

WALTER E. B. JORDAN.